(12) United States Patent
Sano et al.

(10) Patent No.: US 10,523,113 B2
(45) Date of Patent: Dec. 31, 2019

(54) POWER CONVERSION APPARATUS AND CONTROL METHOD FOR POWER CONVERSION APPARATUS

(71) Applicant: Sumitomo Electric Industries, Ltd., Osaka-shi (JP)

(72) Inventors: Takaaki Sano, Osaka (JP); Takeshi Ariyoshi, Osaka (JP); Keiji Tashiro, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/781,281

(22) PCT Filed: Dec. 23, 2016

(86) PCT No.: PCT/JP2016/088592
§ 371 (c)(1),
(2) Date: Jun. 4, 2018

(87) PCT Pub. No.: WO2017/122519
PCT Pub. Date: Jul. 20, 2017

(65) Prior Publication Data
US 2018/0323701 A1 Nov. 8, 2018

(30) Foreign Application Priority Data
Jan. 12, 2016 (JP) .................... 2016-003696

(51) Int. Cl.
*H02M 1/42* (2007.01)
*H02M 7/12* (2006.01)
(Continued)

(52) U.S. Cl.
CPC ......... *H02M 1/4266* (2013.01); *H02M 1/088* (2013.01); *H02M 1/44* (2013.01);
(Continued)

(58) Field of Classification Search
CPC ...... H02M 1/4266; H02M 1/088; H02M 1/44; H02M 3/33584; H02M 2001/0009
See application file for complete search history.

(56) References Cited

U.S. PATENT DOCUMENTS

2009/0034300 A1 2/2009 Ito et al.
2009/0251938 A1* 10/2009 Hallak ............... H02M 7/4807
363/132

FOREIGN PATENT DOCUMENTS

EP 2 963 798 A1 1/2016
JP 2002-369388 A 12/2002
(Continued)

*Primary Examiner* — Jue Zhang
(74) *Attorney, Agent, or Firm* — Baker Botts L.L.P.; Michael A. Sartori

(57) ABSTRACT

A power conversion apparatus comprises a bidirectional conversion circuit that enables first conversion converting DC to AC and second conversion converting AC to DC and a filter circuit that is provided on an AC side of the bidirectional conversion circuit and that includes a capacitor. A control unit is provided for performing control such that the bidirectional conversion circuit makes the first conversion during the former stage of each half cycle of AC voltage, and such that the bidirectional conversion circuit makes the second conversion during the latter stage of each half cycle of AC voltage. The control unit performs control such that AC current of an opposite polarity to that of the AC voltage flows to the AC side during the former stage and AC current of the same polarity as that of the AC voltage flows to the AC side during the latter stage.

5 Claims, 8 Drawing Sheets

(51) Int. Cl.
  *H02M 7/48* (2007.01)
  *H02M 7/797* (2006.01)
  *H02M 1/088* (2006.01)
  *H02M 1/44* (2007.01)
  *H02M 3/335* (2006.01)
  *H02M 1/00* (2006.01)

(52) U.S. Cl.
  CPC ......... *H02M 3/33584* (2013.01); *H02M 7/12* (2013.01); *H02M 7/48* (2013.01); *H02M 7/797* (2013.01); *H02M 2001/0009* (2013.01)

(56) References Cited

FOREIGN PATENT DOCUMENTS

| | | |
|---|---|---|
| JP | 2009-027815 A | 2/2009 |
| JP | 2013-247817 A | 12/2013 |

\* cited by examiner

FIG. 4
OPERATION P1 DURING TIME PERIOD D1
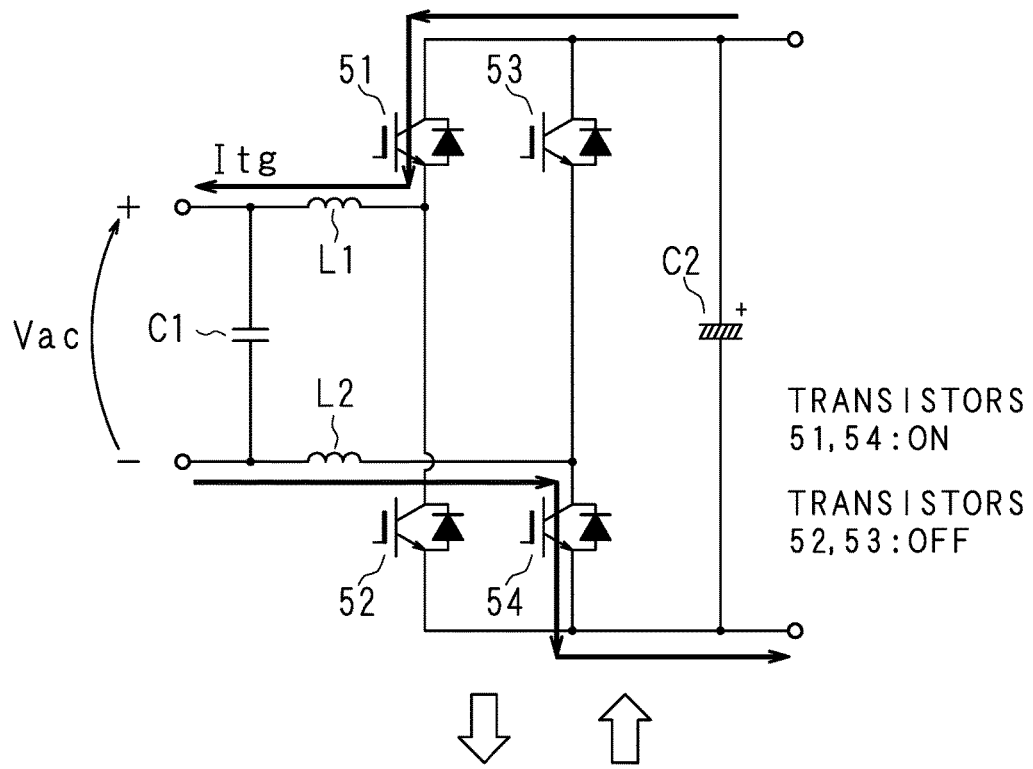
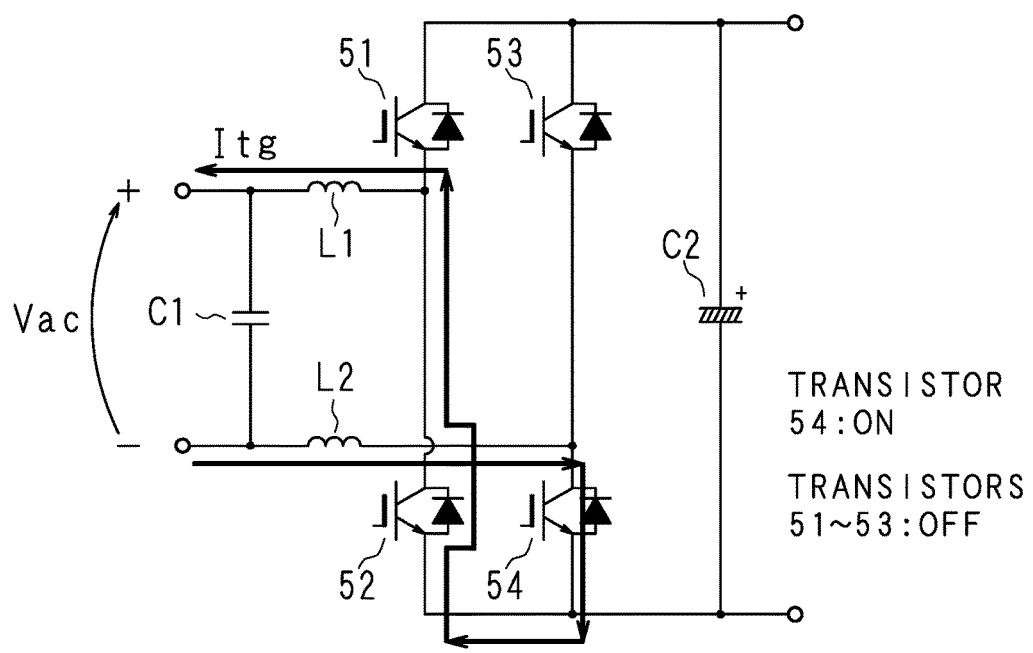

FIG. 5
OPERATION P2 DURING TIME PERIOD D2
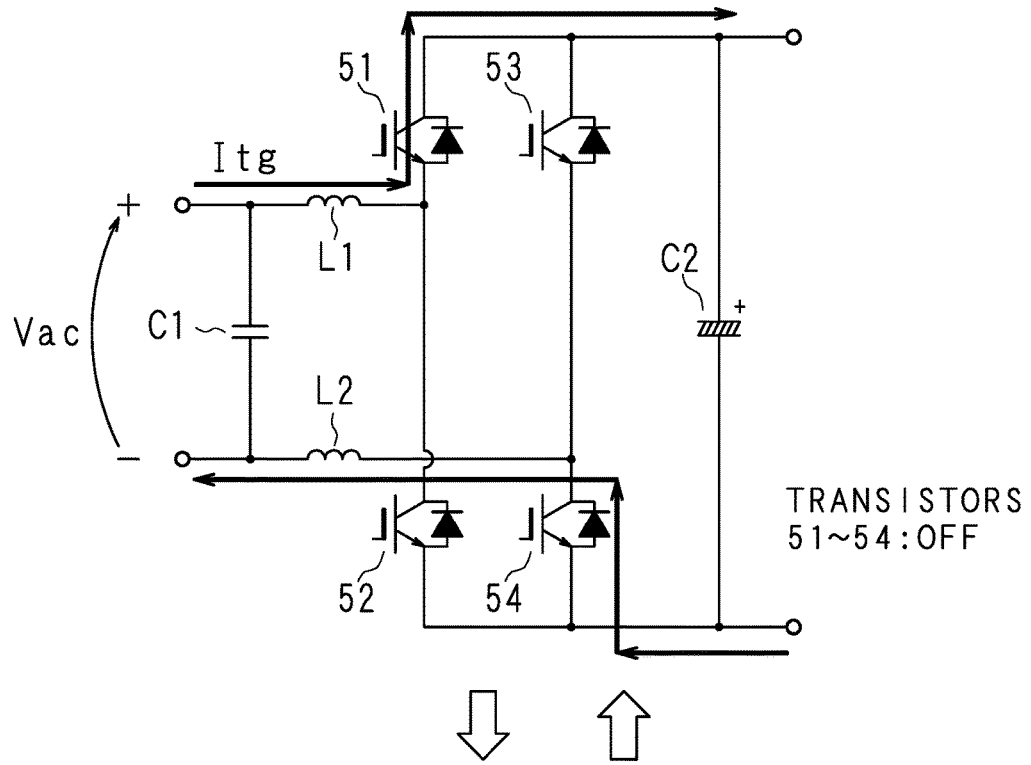
TRANSISTORS
51~54:OFF
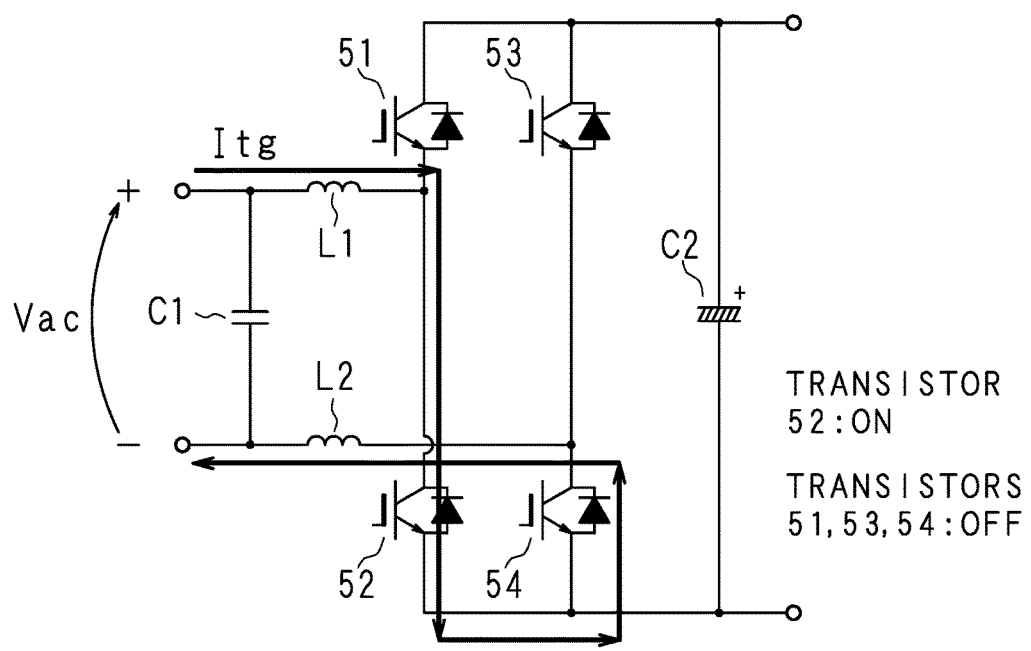
TRANSISTOR
52:ON
TRANSISTORS
51,53,54:OFF FIG. 6
OPERATION P3 DURING TIME PERIOD D3
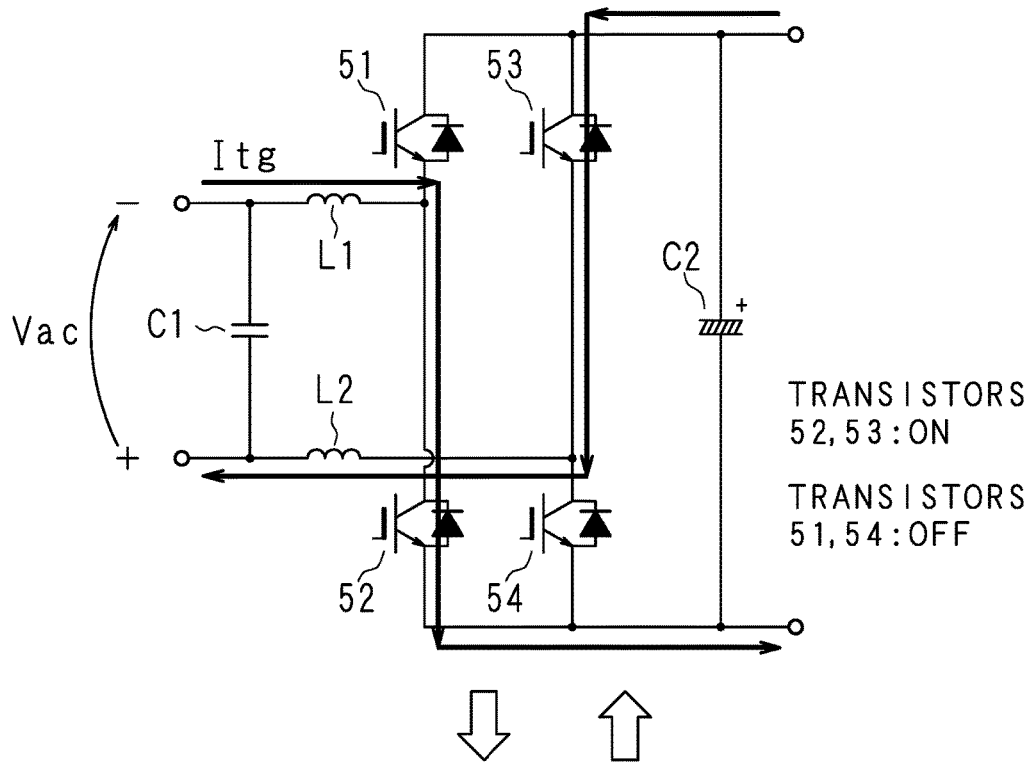
TRANSISTORS
52,53:ON
TRANSISTORS
51,54:OFF
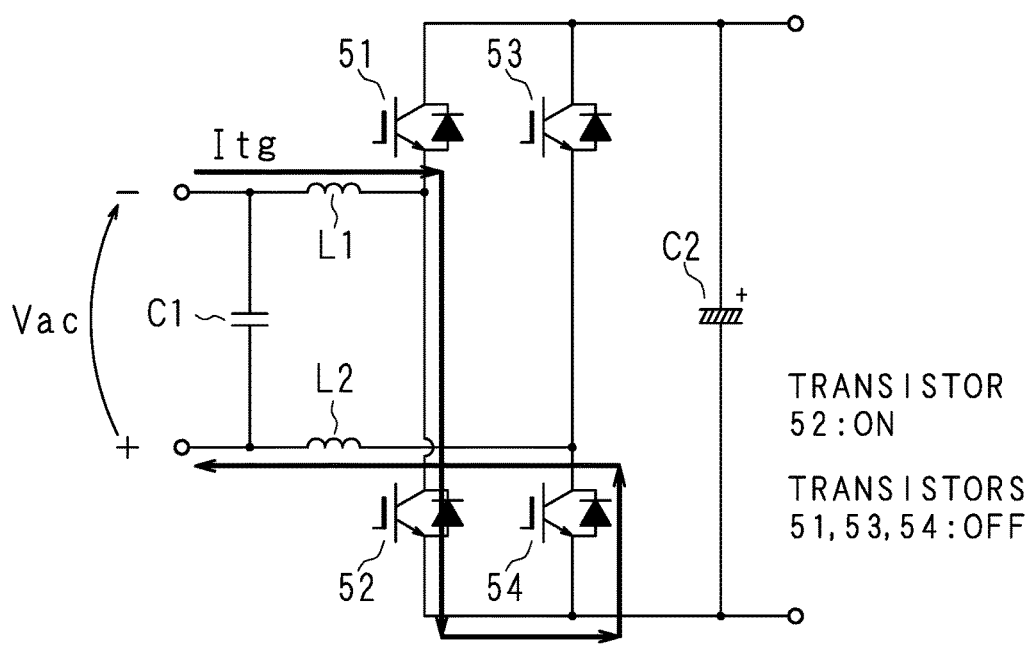
TRANSISTOR
52:ON
TRANSISTORS
51,53,54:OFF FIG. 7
OPERATION P4 DURING TIME PERIOD D4
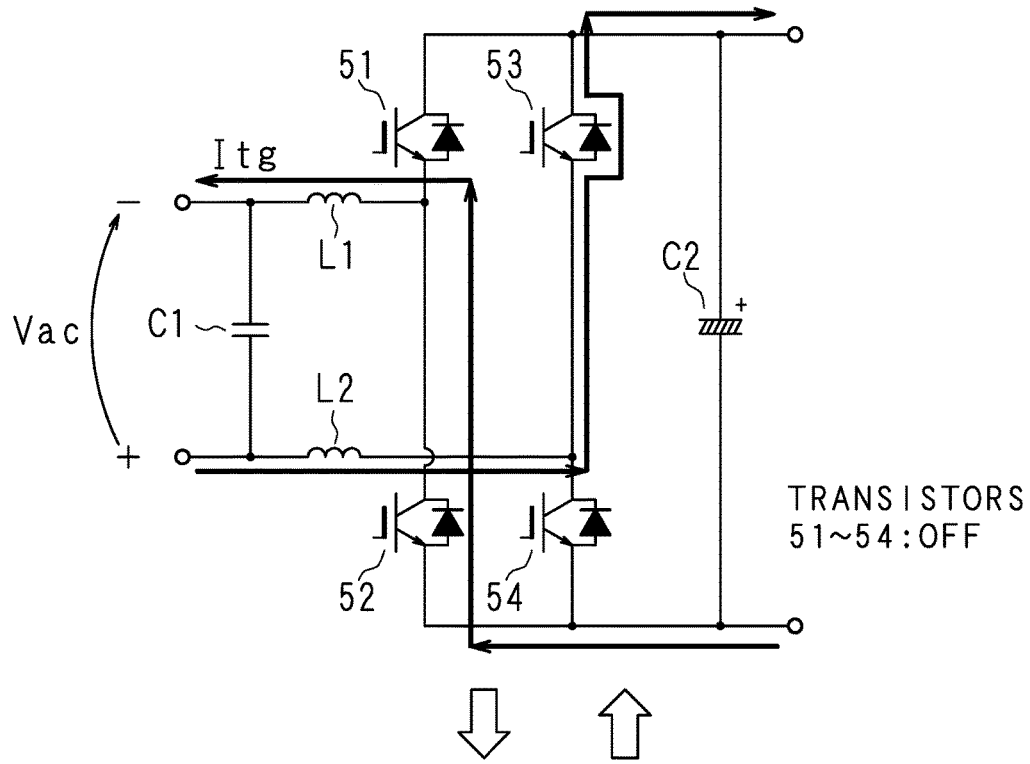
TRANSISTORS
51~54:OFF
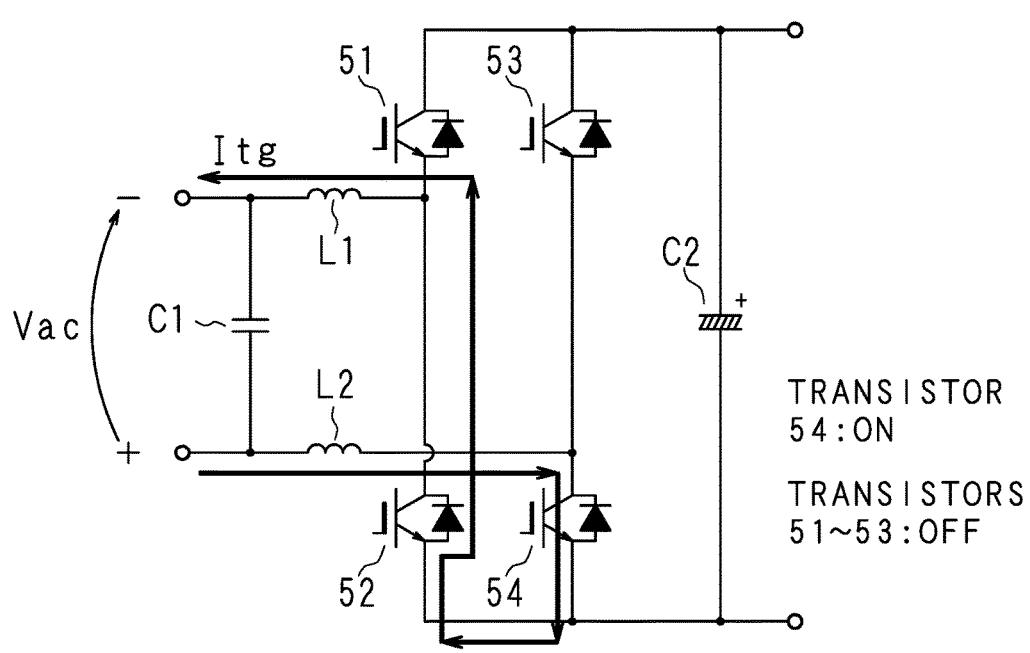
TRANSISTOR
54:ON
TRANSISTORS
51~53:OFF

POWER CONVERSION APPARATUS AND CONTROL METHOD FOR POWER CONVERSION APPARATUS

CROSS-REFERENCE TO RELATED APPLICATIONS

This application is the national phase under 35 U.S.C. § 371 of PCT International Application No. PCT/JP2016/088592 which has an International filing date of Dec. 23, 2016 and designated the United States of America.

FIELD

The present invention relates to a power conversion apparatus and a control method for the power conversion apparatus. The present application claims the benefit of Japanese Patent Application No. 2016-003696 filed on Jan. 12, 2016, the entire contents of which are herein incorporated by reference.

BACKGROUND

A plug-in hybrid electric vehicle (PHEV) and an electric vehicle (EV) are mounted with an on-vehicle charger (for example, AC/DC converter) that enables charging of an on-vehicle high-voltage battery (DC side) from an electric power system (AC side). Meanwhile, expectations run high that the on-vehicle high-voltage battery is utilized as a home power source (V2H: vehicle to home) or as a buffer (V2G: vehicle to grid) for stabilizing the electric power system. This requires a bidirectional charger capable of bidirectionally converting electric power.

Such a bidirectional charger is provided with an AC-DC conversion circuit having a power factor correction (hereinafter referred to as PFC) function of converting AC to DC upon charging and an inverter function of converting DC to AC upon discharging, a DC/DC converter and so on.

On the AC side of an AC-DC conversion circuit, a noise filter circuit is provided for removing noise of the system power supply (commercial power supply) (see Japanese Patent Application Laid-Open Publication No. 2013-247817).

SUMMARY

In a power conversion apparatus according to the present disclosure comprising: a bidirectional conversion circuit that enables first conversion converting direct current (DC) to alternating current (AC) and second conversion converting AC to DC; and a filter circuit that is provided on an AC side of the bidirectional conversion circuit and includes a capacitor, a control unit is provided for performing control such that the bidirectional conversion circuit makes the first conversion during a former stage of each half cycle of AC voltage, and performing control such that the bidirectional conversion circuit makes the second conversion during a latter stage of each half cycle of AC voltage. The control unit performs control such that AC current of an opposite polarity to that of the AC voltage flows to an AC side of the bidirectional conversion circuit during the former stage and performs control such that AC current of a same polarity as the AC voltage flows to an AC side of the bidirectional conversion circuit during the latter stage.

A control method for a power conversion apparatus according to the present disclosure comprising a bidirectional conversion circuit that enables first conversion converting DC to AC and second conversion converting AC to DC and a filter circuit that is provided on an AC side of the bidirectional conversion circuit and includes a capacitor, comprises: performing control by a control unit such that the bidirectional conversion circuit makes the first conversion during a former stage of each half cycle of AC voltage, and performing control by the control unit such that the bidirectional conversion circuit makes the second conversion during a latter stage of each half cycle of AC voltage. The control unit performs control such that AC current of an opposite polarity to that of the AC voltage flows to an AC side of the bidirectional conversion circuit during the former stage and performs control such that AC current of a same polarity as that of the AC voltage flows to the AC side of the bidirectional conversion circuit during the latter stage.

The above and further objects and features of the invention will more fully be apparent from the following detailed description with accompanying drawings.

BRIEF DESCRIPTION OF THE DRAWINGS

FIG. 4 is an illustrative view of one example of operation during a time period D1 of a bidirectional conversion circuit according to the present embodiment.

FIG. 5 is an illustrative view of one example of operation during a time period D2 of the bidirectional conversion circuit according to the present embodiment.

FIG. 6 is an illustrative view of one example of operation during a time period D3 of the bidirectional conversion circuit according to the present embodiment.

FIG. 7 is an illustrative view of one example of operation during a time period D4 of the bidirectional conversion circuit according to the present embodiment.

Figure 1:
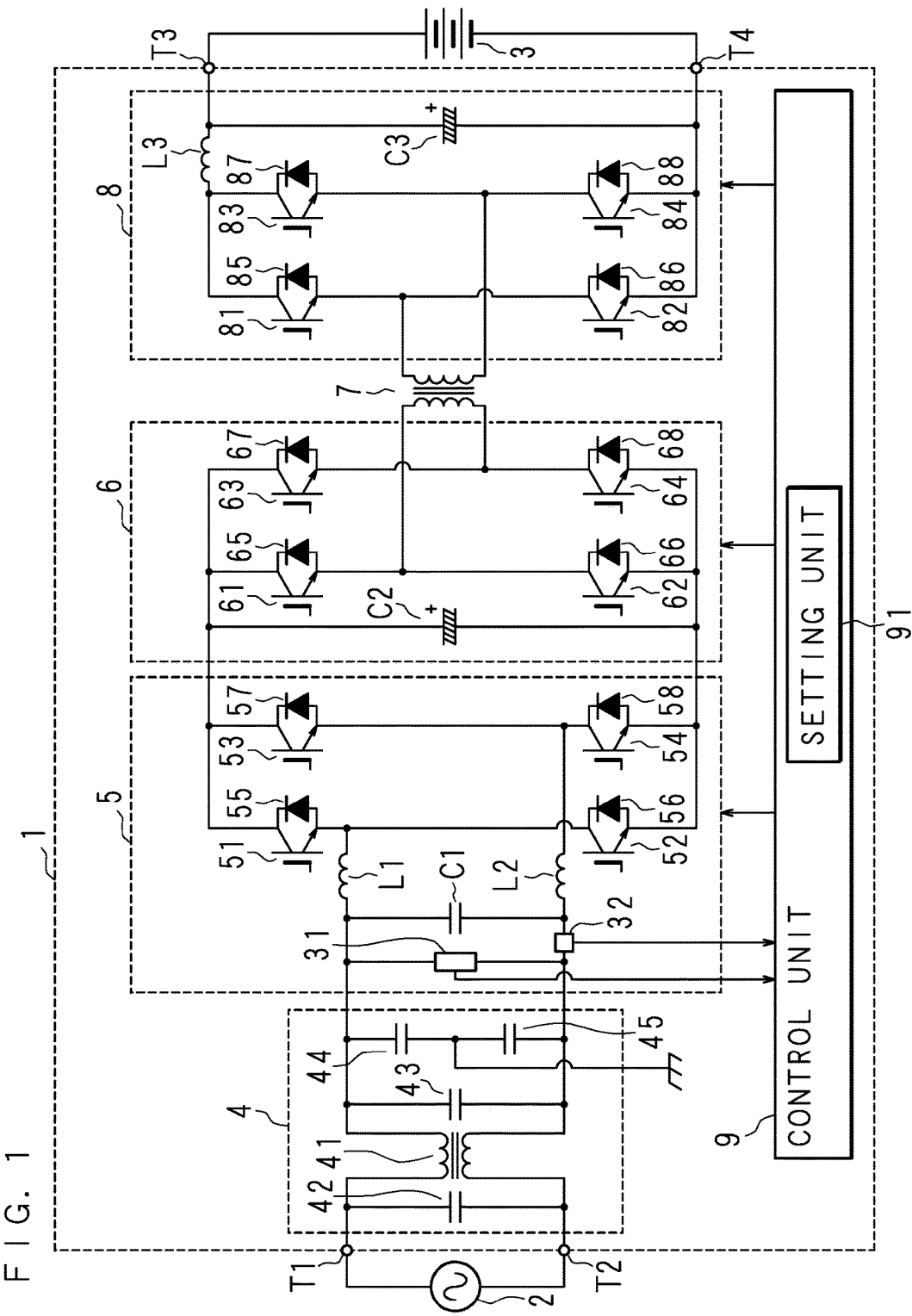
FIG. 1 is an illustrative view illustrating one example of a circuit configuration of a power conversion apparatus according to an embodiment.

In the system described in Japanese Patent Application Laid-Open Publication No. 2013-247817, however, the noise filter circuit includes a capacitor connected across the power supply lines and a capacitor connected between each power supply line and the earth in order to remove noise (common mode noise and normal mode noise) from the system power supply. Thus, due to the shunt current shunted through the capacitors in the noise filter circuit, phase of current flowing through the AC-DC conversion circuit is advanced from phase of the AC voltage, which makes it impossible to improve a power factor.

An object is to provide a power conversion apparatus and a control method for the power conversion apparatus capable of improving a power factor.

According to the present disclosure, it is possible to improve a power factor.

In a power conversion apparatus according to the present embodiment comprising: a bidirectional conversion circuit that enables first conversion converting DC to AC and second conversion converting AC to DC; and a filter circuit that is provided on an AC side of the bidirectional conversion circuit and includes a capacitor, a control unit is provided for performing control such that the bidirectional conversion circuit makes the first conversion during a former stage of each half cycle of AC voltage, and performing control such that the bidirectional conversion circuit makes the second conversion during a latter stage of each half cycle of AC voltage. The control unit performs control such that AC current of an opposite polarity to that of the AC voltage flows to an AC side of the bidirectional conversion circuit during the former stage and performs control such that AC current of a same polarity as that of the AC voltage flows to an AC side of the bidirectional conversion circuit during the latter stage.

A control method for a power conversion apparatus according to the present embodiment comprising a bidirectional conversion circuit that enables first conversion converting DC to AC and second conversion converting AC to DC and a filter circuit that is provided on an AC side of the bidirectional conversion circuit and includes a capacitor, comprises: performing control by a control unit such that the bidirectional conversion circuit makes the first conversion during a former stage of each half cycle of AC voltage, and performing control by the control unit such that the bidirectional conversion circuit makes the second conversion during a latter stage of each half cycle of AC voltage. The control unit performs control such that AC current of an opposite polarity to that of the AC voltage flows to an AC side of the bidirectional conversion circuit during the former stage and performs control such that AC current of a same polarity as that of the AC voltage flows to an AC side of the bidirectional conversion circuit during the latter stage.

The control unit performs control such that the bidirectional conversion circuit makes the first conversion (the operation of converting DC to AC or the so-called inverter operation) during the former stage of each half cycle of AC voltage and causes AC current of an opposite polarity to that of the AC voltage to flow to the AC side of the bidirectional conversion circuit.

The control unit performs control such that the bidirectional conversion circuit performs the second conversion (the operation of converting AC to DC or the so-called PFC operation) during the latter stage of each half cycle of AC voltage and causes AC current of the same polarity as that of the AC voltage to flow to the AC side of the bidirectional conversion circuit.

For example, in the case of the positive half cycle of the AC voltage, negative AC current flows during the former stage, and positive AC current flows during the latter stage. Thus, the AC current is delayed in phase as compared to the AC voltage by the time period corresponding to the former stage. Similarly, in the case of the negative half cycle of the AC voltage, positive AC current flows during the former stage, and negative AC current flows during the latter stage. Thus, the AC current is delayed in phase as compared to the AC voltage by the time period corresponding to the former stage.

The shunt current shunted through the capacitor of the filter circuit is advanced by approximately 90° in phase as compared to AC voltage during charging operation of the power conversion apparatus (for example, operation of converting the system voltage to DC to charge the battery) and during discharging operation (for example, operation of converting the DC from the battery to AC to supply power to the power system). In consequence of the shunt current, the AC voltage on the AC side of the bidirectional conversion circuit and the AC current flowing through the AC side of the bidirectional conversion circuit are shifted in phase, which reduces a power factor. Hence, by causing AC current of an opposite polarity to that of the AC voltage to flow during the former stage of each half cycle of the AC voltage, the phase advance due to the shunt current is canceled out to make the phase of the AC voltage and the phase of the AC current flowing through the power conversion apparatus coincident with each other, which enables power factor improvement (makes a power factor close to 1).

The power conversion apparatus according to the present embodiment comprises: a voltage detection unit that detects voltage on an AC side of the bidirectional conversion circuit; a current detection unit that detects current on an AC side of the bidirectional conversion circuit; and a setting unit that sets a target value for phase delay with respect to a phase of AC voltage in order to cancel out phase advance due to shunt current shunted through the filter circuit based on voltage detected by the voltage detection unit, current detected by the current detection unit and a predetermined value concerning the capacitor in the filter circuit. The former stage is a phase up to the target value within each half cycle while the latter stage is a phase after the target value within each half cycle.

The voltage detection unit detects voltage on an AC side of the bidirectional conversion circuit. The current detection unit detects current on an AC side of the bidirectional conversion circuit.

The setting unit sets a target value $\theta$ for phase delay with respect to the phase of the AC voltage in order to cancel out phase advance due to the shunt current shunted through the filter circuit based on voltage V detected by the voltage detection unit, current I detected by the current detection unit and a predetermined value C concerning the capacitor in the filter circuit. The target value $\theta$ can be calculated from $\theta = -\arcsin(\omega CV/I)$, for example, where a predetermined value C is composite capacitance of the capacitors in the filter circuit, for example, and $\omega$ is angular frequency ($\omega = 2\pi f$) of AC voltage.

The former stage is a phase up to the target value $\theta$ within each half cycle while the latter stage is a phase after the target value within each half cycle. For example, it is assumed that the phase of the positive half cycle of AC voltage is 0° to 180° and the phase of the negative half cycle of AC voltage is 180° to 360°. During the positive half cycle of the AC voltage, the former stage is a time period from 0° to $\theta$ in phase, and the latter stage is a time period from $\theta$ to 180° in phase. During the negative half cycle of the AC voltage, the former stage is a time period from 180° to 180°+$\theta$ in phase and the latter stage is a time period from 180°+$\theta$ to 360° in phase.

Even if the AC voltage or the AC current on the AC side of the bidirectional conversion circuit vary, a target value $\theta$ for phase delay of the AC current with respect to the phase of the AC voltage may be set, which enables power factor improvement. In addition, if the AC current on the AC side of the bidirectional conversion circuit is reduced, it is more likely to be affected by the phase advance by the shunt current shunted through the filter circuit. However, by a flow of AC current of an opposite polarity to that of the AC voltage during the phase up to the target value within each half cycle of the AC voltage, phase advance by the shunt current is canceled out to make the phase of the AC voltage and the phase of the AC current flowing through the power conversion apparatus coincident with each other, which enables power factor improvement.

In the power conversion apparatus according to the present embodiment, the bidirectional conversion circuit comprises a first series circuit that includes a first switching element and a second switching element connected in series, a second series circuit that includes a third witching element and a fourth switching element connected in series and that is connected to the first series circuit in parallel, and a diode connected in antiparallel to each switching element. The control unit performs control so as to repeatedly switch between a state where the first switching element and the fourth switch element are turned on and a state where the fourth switching element is turned on during the former stage of each positive half cycle of AC voltage, and to repeatedly switch between a state where the second switching element and the third switching element are turned on and a state where the second switching element is turned on during the former stage of each negative half cycle of AC voltage. The control unit further performs control so as to repeat a state where the second switching element is turned on during the latter stage of each positive half cycle of AC voltage and to repeat a state where the fourth switching element is turned on during the latter stage of each negative half cycle of AC voltage.

The bidirectional conversion circuit comprises a first series circuit that includes a first switching element and a second switching element connected in series and a second series circuit that includes a third switching element and a fourth switching element that are connected in series and is connected to the first series circuit in parallel. That is, a bridge circuit is formed by four switching elements being the first to fourth switching elements.

The control unit performs control so as to make the first conversion by repeatedly switching between a state where the first switching element and the fourth switch element are turned on and a state where the fourth switching element is turned on during the former stage of each positive half cycle of AC voltage while repeatedly switching between a state where the second switching element and the third switching element are turned on and a state where the second switching element is turned on during the former stage of each negative half cycle of AC voltage.

In addition, the control unit performs control so as to make the second conversion by repeating a state where the second switching element is turned on during the latter stage of each positive half cycle of AC voltage while repeating a state where the fourth switching element is turned on during the latter stage of each negative half cycle of AC voltage.

That is, during the former stage of a positive half cycle of the AC voltage, by repeatedly switching between a state where the first switching element and the fourth switching element are turned on and the second switching element and the third switching element are turned off and a state where only the fourth switching element is turned on, the bidirectional conversion circuit is operated as a so-called inverter, which allows AC current of an opposite polarity to that of the AC voltage to be input/output to flow.

Furthermore, during the latter stage of a positive half cycle of the AC voltage, by repeatedly switching between a state where only the second switching element is turned on and a state where all the first to fourth switching elements are turned off, the bidirectional conversion circuit is operated as a so-called PFC circuit, which allows AC current of the same polarity as that of the AC voltage to be input/output to flow.

In addition, during the former stage of a negative half cycle of the AC voltage, by repeatedly switching between a state where the second switching element and the third switching element are turned on and the first switching element and the fourth switching element are turned off and a state where only the second switching element is turned on, the bidirectional conversion circuit is operated as a so-called inverter, which allows AC current of an opposite polarity to that of the AC voltage to be input/output to flow.

Moreover, during the latter stage of a negative half cycle of the AC voltage, by repeatedly switching between a state where only the fourth switching element is turned on and a state where all the first to fourth switching elements are turned off, the bidirectional conversion circuit is operated as a so-called PFC circuit, which allows AC current of the same polarity as that of the AC voltage to be input/output to flow.

The present invention will be described with reference to the drawings illustrating an embodiment. FIG. 1 is an illustrative view illustrating one example of a circuit configuration of a power conversion apparatus 1 according to a present embodiment. The power conversion apparatus 1 according to the present embodiment is an isolated conversion apparatus that is mounted on, for example, a plug-in hybrid electric vehicle or an electric vehicle, and performs bidirectional AC-DC conversion between AC and DC. The power conversion apparatus 1 includes a filter circuit 4, a bidirectional conversion circuit 5 having a power factor correction (PFC) function, a bidirectional DC/DC converter (for example, isolated DC/DC converter) 6, a transformer 7, a bidirectional conversion circuit 8, a control unit 9 that controls turning on and off of the switching elements described later constituting each conversion circuit and so on. The control unit 9 is provided with a setting unit 91.

The bidirectional conversion circuit 5 has a function as a conversion circuit and is capable of performing first conversion converting DC to AC (so-called inverter operation) and second conversion converting AC to DC (so-called PFC operation).

The bidirectional conversion circuit 5 includes a circuit having a first series circuit and a second series circuit connected in parallel. The first series circuit includes a transistor 51 serving as a first switching element and a transistor 52 serving as a second switching element that are connected in series. The second series circuit includes a transistor 53 serving as a third switching element and a transistor 54 serving as a fourth switching element that are connected in series. For example, an insulated gate bipolar transistor (hereinafter, referred to as IGBT), although not limited to the IGBT, may be employed for the transistors 51, 52, 53 and 54, or a metal oxide semiconductor field effect transistor (hereinafter referred to as MOSFET) may be employed in place of the IGBT. Furthermore, diodes 55, 56, 57 and 58 are connected in antiparallel (the collector is connected to the cathode and the emitter is connected to the anode) between the collectors and the emitters of the transistors 51, 52, 53 and 54, respectively.

The connection point of the emitter of the transistor 51 and the collector of the transistor 52 is connected to one end of a coil L1 while the connection point of the emitter of the transistor 53 and the collector of the transistor 54 is connected to one end of a coil L2. The other ends of the coils L1 and L2 are respectively connected to the AC terminals T1 and T2 via the noise filter 4. Between the other ends of the coils L1 and L2, a capacitor C1 is connected. The AC terminals T1 and T2 are connected to a system power supply 2 such as commercial power supply.

The filter circuit 4 is provided on the AC side of the bidirectional conversion circuit 5 and includes capacitors 42 and 43 for mainly removing normal mode noise between power supply lines, capacitors 44 and 45 for mainly removing common mode noise between power supply lines, a coil 41 and so on. The configuration of the filter circuit 4 is not limited to the example illustrated in FIG. 1.

On the AC side of the bidirectional conversion circuit 5, a voltage detection unit 31 for detecting AC voltage on the AC side of the bidirectional conversion circuit 5 and a current detection unit 32 for detecting AC current on the AC side of the bidirectional conversion circuit 5 are connected. The voltage detection unit 31 outputs the detected voltage to the control unit 9 while the current detection unit 32 outputs the detected current to the control unit 9. Note that the AC voltage on the AC side of the bidirectional conversion circuit 5 is also called system voltage.

The bidirectional conversion circuit 6 includes a first series circuit and a second series circuit connected in parallel. The first series circuit includes a transistor 61 and a transistor 62 connected in series while the second series circuit includes a transistor 63 and a transistor 64 connected in series. More specifically, the emitter of the transistor 61 and the collector of the transistor 62 are connected, and the emitter of the transistor 63 and the collector of the transistor 64 are connected. Furthermore, the collectors of the transistors 61 and 63 are connected to each other while the emitters of the transistors 62 and 64 are connected to each other. The emitters of the transistors 62 and 64 are connected to the emitters of the transistors 52 and 54 of the bidirectional conversion circuit 5 while the collectors of the transistors 61 and 63 are connected to the collectors of the transistors 51 and 53 of the bidirectional conversion circuit 5.

The connection point of the emitter of the transistor 61 and the collector of the transistor 62 and the connection point of the emitter of the transistor 63 and the collector of the transistor 64 are connected to the other side of the transformer 7. Furthermore, between the collectors and the emitters of the transistors 61, 62, 63 and 64, diodes 65, 66, 67 and 68 are respectively connected in antiparallel.

A capacitor C2 is connected to the bidirectional conversion circuit 6 on the bidirectional conversion circuit 5 side. That is, the capacitor C2 is connected between the collector of the transistor 61 and the emitter of the transistor 62.

The control unit 9 controls turning on and off of each of the transistors 61, 62, 63 and 64 at a predetermined frequency (for example, 50 kHz although the frequency is not limited thereto). For example, an IGBT may be employed for each of the transistors 61, 62, 63 and 64, though not limited to the IGBT, but a MOSFET may be employed in place of the IGBT.

The bidirectional conversion circuit 8 includes a first series circuit and a second series circuit connected in parallel. The first series circuit includes a transistor 81 and a transistor 82 connected in series while the second series circuit includes a transistor 83 and a transistor 84 connected in series. More specifically, the emitter of the transistor 81 and the collector of the transistor 82 are connected, and the emitter of the transistor 83 and the collector of the transistor 84 are connected. Furthermore, the collectors of the transistors 81 and 83 are connected to each other while the emitters of the transistors 82 and 84 are connected to each other. The emitters of the transistors 82 and 84 are connected to a DC output terminal T4.

An inductor L3 is connected, at one end, to the collectors of the transistors 81 and 83 and connected, at the other end, to a DC output terminal T3. Across the DC output terminals T3 and T4, a capacitor C3 is connected. Across the DC output terminals T3 and T4, a battery 3 is connected.

The connection point of the emitter of the transistor 81 and the collector of the transistor 82 and the connection point of the emitter of the transistor 83 and the collector of the transistor 84 are connected to one side of the transformer 7. Furthermore, between the collectors and the emitters of the transistors 81, 82, 83 and 84, diodes 85, 86, 87 and 88 are respectively connected in antiparallel.

The control unit 9 performs control to turn on and off each of the transistors 81, 82, 83 and 84 at a predetermined frequency (50 kHz, for example, although the frequency is not limited thereto). For example, an IGBT may be employed for each of the transistors 81, 82, 83 and 84, though not limited to the IGBT, but a MOSFET may be employed in place of the IGBT.

Upon charging, the AC supplied from the system power supply 2 and applied across the AC input terminals T1 and T2 is improved in the power factor and converted to DC by the bidirectional conversion circuit 5. The converted DC is temporarily converted to AC by the bidirectional conversion circuit 6, and the converted AC is further rectified by the bidirectional conversion circuit 8 and then charged in the battery 3.

Upon discharging, the DC supplied from the battery 3 is temporarily converted to AC by the bidirectional conversion circuit 8, and the converted AC is further rectified to DC by the bidirectional conversion circuit 6. The converted DC is converted to AC by the bidirectional conversion circuit 5, and the AC is output.

The following describes an operation of the power conversion apparatus 1 according to the present embodiment, especially the bidirectional conversion circuit 5. Note that the operation of the power conversion apparatus 1 upon charging will be described while the same description applies to the operation upon discharging.

Figure 2:
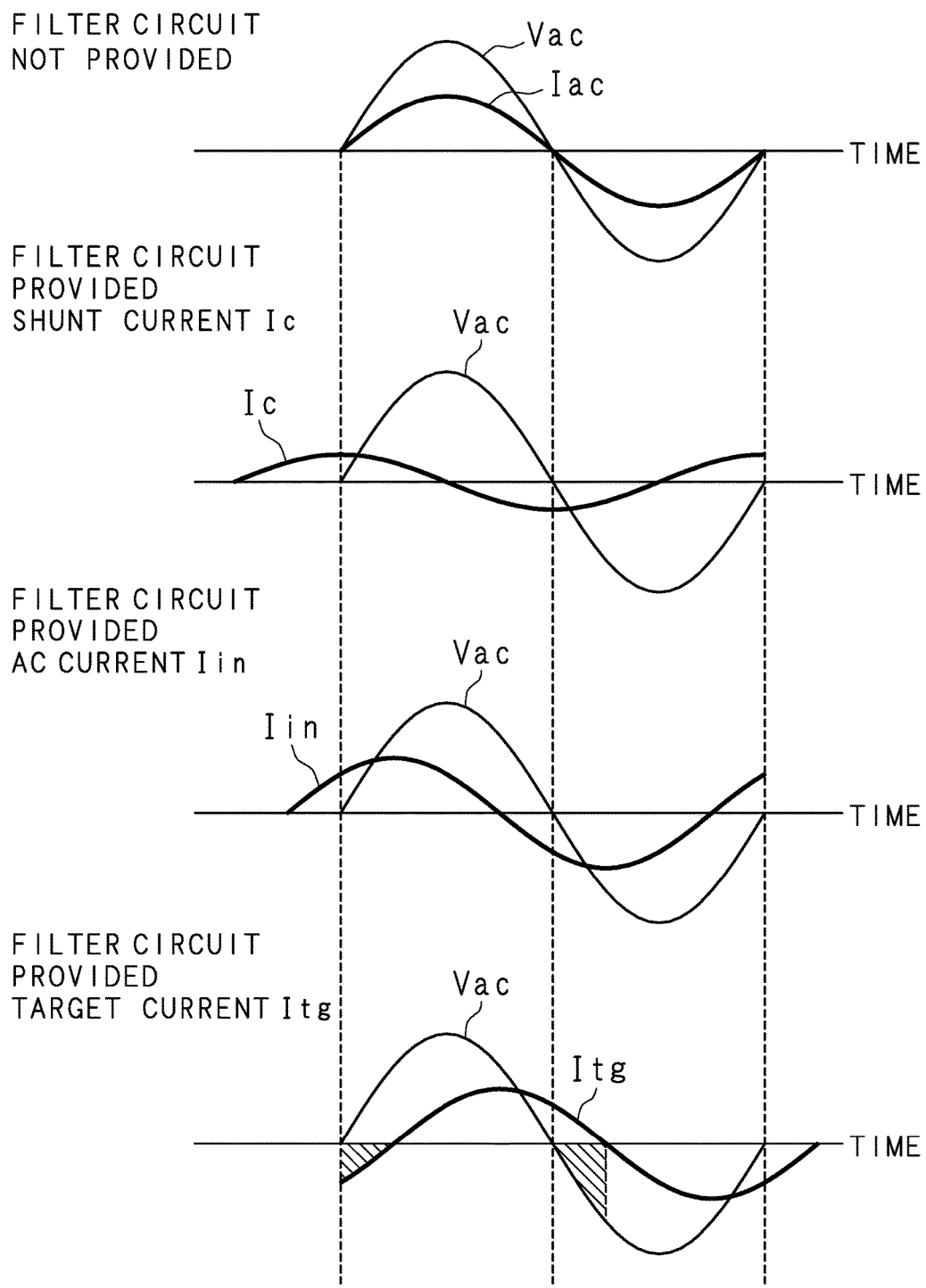
FIG. 2 is a schematic view illustrating one example of voltage and current during charging of the power conversion apparatus according to the present embodiment.

FIG. 2 is a schematic view illustrating one example of voltage and current during charging of the power conversion apparatus 1 according to the present embodiment. The first drawing from the top in FIG. 2 depicts the AC voltage Vac across the AC terminals T1 and T2 and the AC current Iac flowing through the the AC terminals T1 and T2 assuming that the filter circuit 4 is not provided. As illustrated in the drawing, the AC voltage Vac and the AC current Iac match in phase with each other, and the power factor is equal to 1 or a value close to 1 by the PFC operation performed by the bidirectional conversion circuit 5. The impedance when the power conversion apparatus 1 is viewed from the AC terminals T1 and T2 includes a simple resistance component as well as inductance and capacitance. Thus, the voltage waveform of voltage across the AC terminals T1 and T2 and the current waveform of current flowing through the AC terminals T1 and T2 shift in phase. The PFC operation controls current such that the current waveform of current flowing through the AC terminals T1 and T2 varies in phase with the voltage waveform of voltage across the AC terminals T1 and T2. It is noted that the PFC operation also has a function of reducing harmonic current.

The second drawing from the top in FIG. 2 depicts a phase relationship between shunt current Ic shunted across the capacitors within the filter circuit 4 and the AC voltage Vac across the AC terminals T1 and T2 when the filter circuit 4 is connected. Assuming that the composite capacitor of capacitors 42, 43, 44 and 45 in the filter circuit 4 is denoted by a capacitor C and the inductance of the coil 41 can be neglected, the shunt current Ic is advanced by 90° in phase with respect to the AC voltage Vac. Even taking the inductance of the coil 41 into account, the shunt current Ic is consequently advanced by approximately 90° in phase with respect to the AC voltage Vac.

As illustrated in the third drawing from the top in FIG. 2, in a case where the filter circuit 4 is connected, even if the PFC operation is performed by the bidirectional conversion circuit 5, the AC current Iin flowing through the AC terminals T1 and T2 is advanced in phase as compared to the AC voltage Vac, and the AC voltage Vac and the AC current Iac shift in phase, resulting in reduction in a power factor.

Hence, as illustrated from the fourth drawing from the top in FIG. 2, a target current Itg with phase delay with respect to the AC voltage Vac is caused to flow on the AC side of the bidirectional conversion circuit 5 such that the phase advance due to the shunt current Ic shunted through the filter circuit 4 is canceled out, to make the phase of the AC current Iin flowing through the AC terminals T1 and T2 and the phase of the AC voltage Vac coincident with each other. That is, by causing the target current Itg with delayed phase with respect to the AC voltage Vac to flow, the AC current Iin with phase advance with respect to the AC voltage Vac is made coincident with the phase of the AC voltage Vac like the AC current Iac. This makes it possible to make the power factor of the power conversion apparatus 1 equal to or close to 1.

Here, even in the case where the bidirectional conversion circuit 5 is operated as a PFC circuit, the PFC operation allows current with a required peak value to flow if the AC voltage Vac on the AC side of the bidirectional conversion circuit 5 and the target current Itg are the same in polarity, while no current may actually flow during the time period in which the AC voltage (system voltage) Vac and the target current Itg are opposite in polarity (the time period denoted by pattern in the fourth drawing from the top in FIG. 2). Thus, the power conversion apparatus 1 according to the present embodiment is operated as described below.

Figure 3:
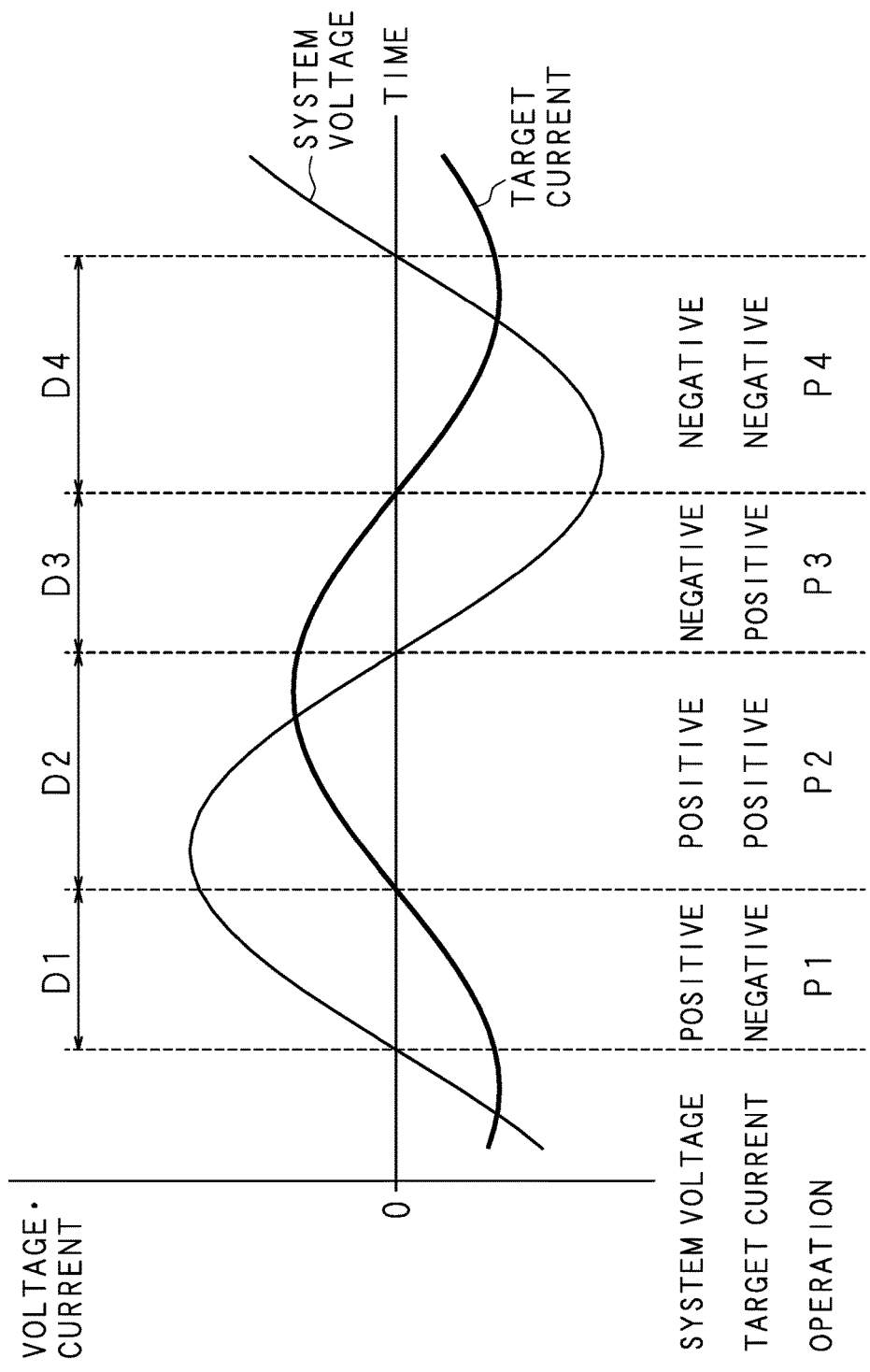
FIG. 3 is an illustrative view of one example of operation based on phase relationships between system voltage and target current of the bidirectional conversion circuit according to the present embodiment.

FIG. 3 illustrates one example of the operation based on a phase relationship between system voltage and target current of the bidirectional conversion circuit 5 according to the present embodiment. In FIG. 3, the system voltage is AC voltage on the AC side of the bidirectional conversion circuit 5, and the target current is AC current flowing on the AC side of the bidirectional conversion circuit 5. As illustrated in FIG. 3, based on the phase relationships between the system voltage (AC voltage) and the target current, one cycle of the system voltage is divided into four time periods D1, D2, D3 and D4. The target current is delayed in phase with respect to the system voltage by the amount corresponding to the time period D1 or D3. That is, a target value θ for the phase delay of the target current is a phase corresponding to the time period D1 or D3.

Assuming that the time period D1 is the former stage of the positive half cycle of the system voltage and one cycle of the phase of the system voltage is 0° to 360°, the former stage is the duration from 0° to θ in phase. During the time period D1, the system voltage is positive while the target current is negative, resulting that the system voltage and the target current have opposite polarities. During the time period D1, operation P1 (first conversion, that is, inverter operation) described later is performed.

Assuming that the time period D2 is the latter stage of the positive half cycle of the system voltage and one cycle of the phase of the system voltage is 0° to 360°, the latter stage is the duration from θ to 180° in phase. During the time period D2, the system voltage is positive while the target current is positive, resulting that the system voltage and the target current have the same polarity. During the time period D2, operation P2 (second conversion, that is, PFC operation) described later is performed.

Assuming that the time period D3 is the former stage of the negative half cycle of the system voltage, and one cycle of the phase of the system voltage is 0° to 360°, the former stage is the duration from 180° to 180°+θ in phase. During the time period D3, the system voltage is negative while the target current is positive, resulting that the system voltage and the target current have opposite polarities. During the time period D3, operation P3 (first conversion, that is, inverter operation) described later is performed.

Assuming that the time period D4 is the latter stage of the negative half cycle of the system voltage, and one cycle of the phase of the system voltage is 0° to 360°, the latter stage is the duration from 180°+θ to 360° in phase. During the time period D4, the system voltage is negative while the target current is negative, resulting that the system voltage and the target current have the same polarity. During the time period D4, operation P4 (second conversion, that is, PFC operation) described later is performed.

That is, the control unit 9 performs control so that the bidirectional conversion circuit 5 makes the first conversion (operation of converting DC to AC, so-called inverter operation) during the former stage of each half cycle of the AC voltage (system voltage) and causes AC current (target current in FIG. 3) of an opposite polarity to that of the AC voltage to flow on the AC side of the bidirectional conversion circuit 5.

Furthermore, the control unit 9 performs control so that the bidirectional conversion circuit 5 makes the second conversion (operation of converting AC to DC, so-called PFC operation) during the latter stage of each half cycle of the AC voltage and causes AC current (target current in FIG. 3) of the same polarity as that of the AC voltage to flow on the AC side of the bidirectional conversion circuit 5.

For example, in the case of the positive half cycle of the AC voltage, negative AC current flows during the former stage, and positive AC current (target current in FIG. 3) flows during the latter stage. Thus, the AC current is delayed in phase as compared to the AC voltage by the time period corresponding to the former stage (the time period D1 in FIG. 3). Similarly, in the case of the negative half cycle of the AC voltage, positive AC current flows during the former stage, and negative AC current (target current in FIG. 3) flows during the latter stage. Thus, the AC current is delayed in phase as compared to the AC voltage by the time period corresponding to the former stage (the time period D3 in FIG. 3).

The shunt current shunted through the capacitor of the filter circuit 4 is advanced by approximately 90° in phase as compared to AC voltage upon charging operation of the power conversion apparatus 1 (for example, operation of converting the system voltage to DC current to charge the battery 3) and upon discharging operation (for example, operation of converting the DC current from the battery 3 to AC current to supply power to the power system) of the power conversion apparatus 1. In consequence of the shunt current, the AC voltage on the AC side of the bidirectional conversion circuit 5 and the AC current flowing through the AC side of the bidirectional conversion circuit 5 shift in phase, which reduces a power factor. Hence, by causing AC current (target current) of an opposite polarity to that of the AC voltage to flow during the former stage of each half cycle of the AC voltage, the phase advance due to the shunt current is canceled out to make the phase of the AC voltage and the phase of the AC current (AC current flowing through the AC terminals T1 and T2) flowing through the power conversion apparatus 1 coincident with each other, which enables power factor improvement (make a power factor close to 1), for example.

The setting unit 91 sets a target value θ for phase delay with respect to the phase of the AC voltage in order to cancel out phase advance due to the shunt current shunted through the filter circuit 4 based on the peak value V of the AC voltage Vac detected by the voltage detection unit 31, the peak value I of the AC current (target current) Itg detected by the current detection unit 32 and a predetermined value C concerning the capacitors in the filter circuit 4.

The target value θ can be calculated from θ=−arcsin (ωCV/I), for example, where the predetermined value C is composite capacitance of the capacitors in the filter circuit, and ω is angular frequency (ω=2πf) of AC voltage.

Even if the AC voltage or the AC current on the AC side of the bidirectional conversion circuit 5 varies, a target value θ for phase delay of the AC current with respect to the phase of the AC voltage may be set, which enables power factor improvement. In addition, if the AC current on the AC side of the bidirectional conversion circuit 5 is reduced, it is more likely to be affected by the phase advance by the shunt current shunted through the filter circuit 4. However, by a flow of AC current of an opposite polarity to that of the AC voltage during the phase up to the target value within each half cycle of the AC voltage, phase advance by the shunt current is canceled out to make the phase of the AC voltage coincident with the phase of the AC current flowing through the power conversion apparatus 1 each other, which enables power factor improvement.

The following describes the detail of the operation during each of the time periods D1 to D4. FIG. 4 is an illustrative view of one example of the operation during the time period D1 of the bidirectional conversion circuit 5 according to the present embodiment. As illustrated in FIG. 4, the control unit 9 repeatedly performs switching between the state where the transistors 51 and 54 are turned on and the transistors 52 and 53 are turned off (the upper drawing in FIG. 4) and the state where only the transistor 54 is turned on (the lower drawing in FIG. 4) during the time period D1 (during the former stage of each positive half cycle of the AC voltage).

In the state illustrated in the upper drawing in FIG. 4, target current Itg flows from the positive DC side of the bidirectional conversion circuit 5 through the transistor 51, the inductor L1, the inductor L2 and the transistor 54. Meanwhile, in the state illustrated in the lower drawing in FIG. 4, by the energy stored in the inductors L1 and L2, target current Itg flows through the inductors L1 and L2, the transistor 54 and the diode (56) connected in antiparallel to the transistor 52. Thus, the bidirectional conversion circuit 5 is operated as a so-called inverter to thereby cause AC current (target current) Itg of an opposite polarity to that of the input and output AC voltage Vac to flow.

FIG. 5 is an illustrative view of one example of the operation during the time period D2 of the bidirectional conversion circuit 5 according to the present embodiment. As illustrated in FIG. 5, the control unit 9 repeatedly performs switching between the state where all the transistors 51 to 54 are turned off (the upper drawing in FIG. 5) and the state where only the transistor 52 is turned on (the lower drawing in FIG. 5) during the time period D2 (during the latter stage of each positive half cycle of the AC voltage).

In the state illustrated in the upper drawing in FIG. 5, target current Itg flows through the inductor L1, the diode (55) connected in antiparallel to the transistor 51, the DC side of the bidirectional conversion circuit 5, the diode (58) connected in antiparallel to the transistor 54 and the inductor L2. Meanwhile, in the state illustrated in the lower drawing in FIG. 5, by the energy stored in the inductors L1 and L2, target current Itg flows through the inductors L1, the transistor 52, the diode (58) connected in antiparallel to the transistor 54 and the inductor L2. Thus, the bidirectional conversion circuit 5 is operated as a so-called PFC circuit to thereby cause AC current (target current) Itg of the same polarity as that of the input and output AC voltage Vac to flow.

FIG. 6 is an illustrative view of one example of the operation during the time period D3 of the bidirectional conversion circuit 5 according to the present embodiment. As illustrated in FIG. 6, the control unit 9 repeats switching between the state where the transistors 52 and 53 are turned on and the transistors 51 and 54 are turned off (the upper drawing in FIG. 6) and the state where only the transistor 52 is turned on (the lower drawing in FIG. 6) during the time period D3 (during the former stage of each negative half cycle of the AC voltage).

In the state illustrated in the upper drawing in FIG. 6, target current Itg flows from the positive DC side of the bidirectional conversion circuit 5 through the transistor 53, the inductor L2, the inductor L1 and the transistor 52. Meanwhile, in the state illustrated in the lower drawing in FIG. 6, by the energy stored in the inductors L1 and L2, the target current Itg flows through inductor L1, the transistor 52, the diode (58) connected in antiparallel to the transistor 54 and the inductor L2. Thus, the bidirectional conversion circuit 5 is operated as a so-called inverter to thereby cause AC current (target current) Itg of an opposite polarity to that of the input and output AC voltage Vac to flow.

FIG. 7 is an illustrative view of one example of the operation during the time period D4 of the bidirectional conversion circuit 5 according to the present embodiment. As illustrated in FIG. 7, the control unit 9 repeats switching between the state where all the transistors 51 to 54 are turned off (the upper drawing in FIG. 7) and the state where only the transistor 54 is turned on (the lower drawing in FIG. 7) during the time period D4 (during the latter stage of each negative half cycle of the AC voltage).

In the state illustrated in the upper drawing in FIG. 7, target current Itg flows through the inductor L2, the diode (57) connected in antiparallel to the transistor 53, the DC side of the bidirectional conversion circuit 5, the diode (56) connected in antiparallel to the transistor 52 and the inductor L1. Meanwhile, in the state illustrated in the lower drawing in FIG. 7, by the energy stored in the inductors L1 and L2, target current Itg flows through the inductor L2, the transistor 54, the diode (56) connected in antiparallel to the transistor 52 and the inductor L1. Thus, the bidirectional conversion circuit 5 is operated as a so-called PFC circuit to thereby cause AC current (target current) Itg of the same polarity as that of the input and output AC voltage Vac to flow.

Figure 8:
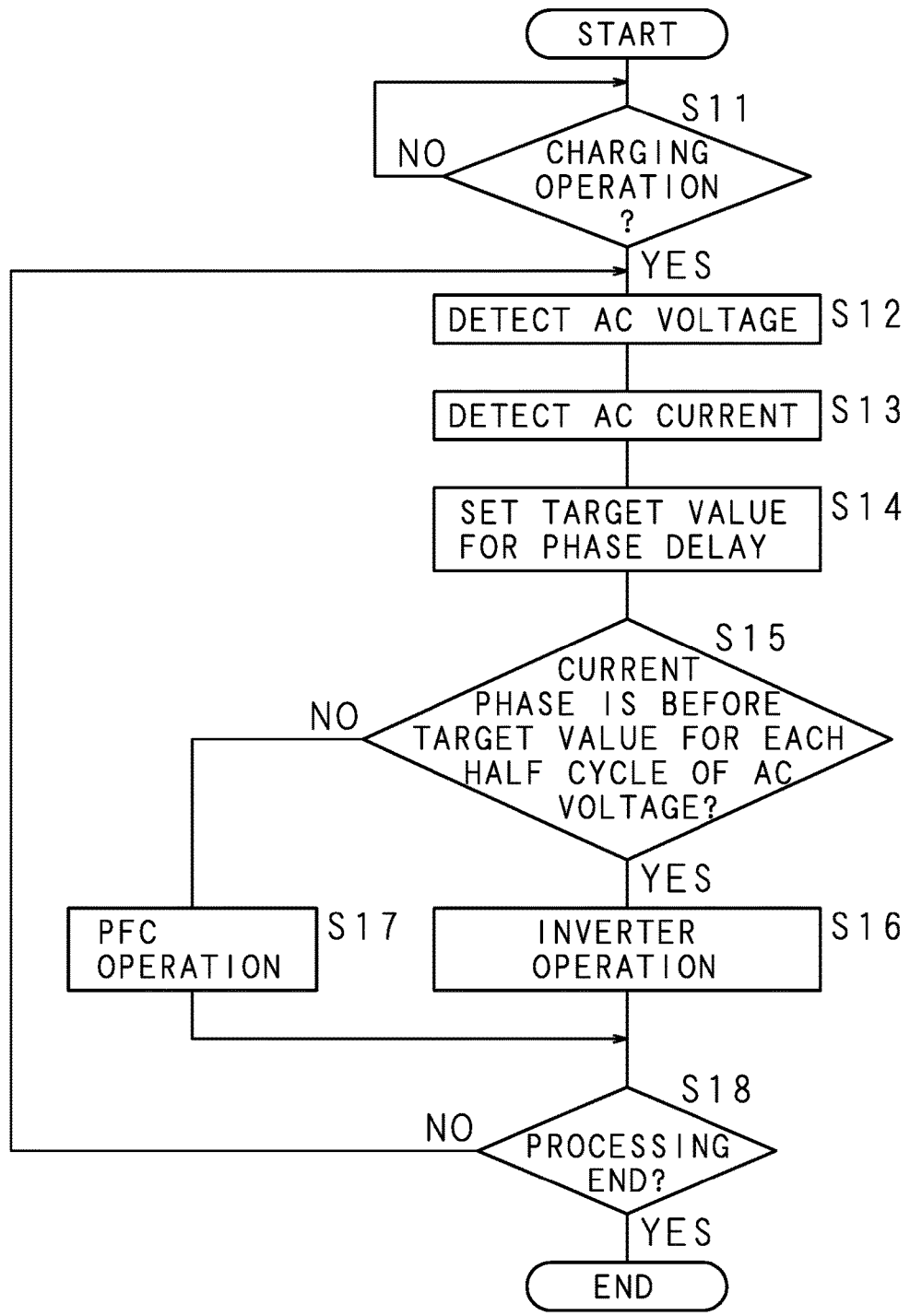
FIG. 8 is a flowchart of one example of a processing procedure of the power conversion apparatus according to the present embodiment.

FIG. 8 is a flowchart of one example of the processing procedure of the power conversion apparatus 1 according to the present embodiment. FIG. 8 depicts the processing procedure upon charging operation of the power conversion apparatus 1, but the present embodiment may apply to discharging operation as well. For convenience, the following description is made regarding the subject of the processing as the control unit 9.

The control unit 9 determines whether or not charging operation is performed (S11), and if charging operation is not performed (NO at step S11), the processing at step S11 is continued. If charging operation is performed (YES at S11), the control unit 9 detects AC voltage (system voltage) (S12) and detects AC current (S13). Note that the AC voltage may be detected by the voltage detection unit 31 while the AC current may be detected by the current detection unit 32.

The control unit 9 sets a target value θ for phase delay of target current Itg (S14) and determines whether or not the current phase is up to the target value θ for each half cycle of the AC voltage (S15). If the current phase is up to the target value θ (YES at S15), the control unit 9 causes the bidirectional conversion circuit 5 to perform an inverter operation (first conversion) (S16) and performs processing at step S18 described later.

If the current phase is not up to the target value θ (NO at step S15), the control unit 9 causes the bidirectional conversion circuit 5 to operate as a PFC circuit (second conversion) (S17) and performs the processing at step S18 described later. The control unit 9 determines whether or not the processing is to be ended (S18). If the processing is not to be ended (NO at step S18), the processing at step S12 onward is performed while if the processing is to be ended (YES at step S18), the process is ended.

As described above, according to the present embodiment, even if a filter circuit including a capacitor is provided on the AC side of the bidirectional conversion circuit 5, phase advance due to the shunt current shunted through the filter circuit is canceled out, to make the power factor equal to or close to 1.

Though the case where the power conversion apparatus 1 performs charging operation is described in the above-described embodiment, the present embodiment may also be applied to a case where the power conversion apparatus 1 performs discharging operation without limitation. That is, in the case where the power conversion apparatus 1 performs discharging operation, the operation depicted in FIG. 6 is performed during the time period D1 in FIG. 3, the operation depicted in FIG. 7 is performed during the time period D2 in FIG. 3, the operation depicted in FIG. 4 is performed during the time period D3 in FIG. 3, and the operation depicted in FIG. 5 is performed during the time period D4 in FIG. 3.

The bidirectional conversion circuits 6 and 8 are not limited to the circuit configuration illustrated in FIG. 1, and can be achieved by other circuit configuration.

It is to be understood that the embodiments herein disclosed are illustrative in all respects and not restrictive. The scope of the present invention is defined by the appended claims rather than by the above-described embodiment and examples, and all changes that fall within the meanings and the bounds of the claims, or equivalence of such meanings and bounds are intended to be embraced by the claims.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A power conversion apparatus, comprising a bidirectional conversion circuit that enables first conversion converting DC to AC and second conversion converting AC to DC; AC terminals; and a filter circuit that is provided between the AC terminals and the bidirectional conversion circuit and includes a capacitor, further comprising:
a control unit performing control such that the bidirectional conversion circuit makes the first conversion during a former stage of each half cycle of AC voltage, and performing control such that the bidirectional conversion circuit makes the second conversion during a latter stage of each half cycle of AC voltage, wherein
the control unit performs control such that AC target current of a polarity opposite to a polarity of the AC voltage flows from the bidirectional conversion circuit toward the AC terminals during the former stage and performs control to reduce phase shift between AC voltage and AC current flowing through the AC terminals due to a shunt current flowing the filter circuit, and
the control unit performs control such that AC target current of a same polarity as a polarity of the AC voltage flows from the AC terminals toward the bidirectional conversion circuit during the latter stage and performs control to reduce phase shift between AC voltage and AC current flowing through the AC terminals due to a shunt current flowing the filter circuit.

2. The power conversion apparatus according to claim 1, comprising:
a voltage detection unit that detects voltage on an AC side of the bidirectional conversion circuit;
a current detection unit that detects current on an AC side of the bidirectional conversion circuit; and
a setting unit that sets a target value for phase delay with respect to a phase of AC voltage in order to cancel out phase advance by shunt current shunted through the filter circuit based on voltage detected by the voltage detection unit, current detected by the current detection unit and a predetermined value concerning the capacitor in the filter circuit,
wherein the former stage is a phase up to the target value within each half cycle, and the latter stage is a phase after the target value within each half cycle.

3. The power conversion apparatus according to claim 1, wherein the bidirectional conversion circuit comprises
a first series circuit that includes a first switching element and a second switching element connected in series,
a second series circuit that includes a third switching element and a fourth switching element connected in series and that is connected to the first series circuit in parallel, and
a diode connected in antiparallel to each switching element, wherein
the control unit performs control so as to repeatedly switch between a state where the first switching element and the fourth switch element are turned on and a state where the fourth switching element is turned on, during the former stage of each positive half cycle of AC voltage, and to repeatedly switch between a state where the second switching element and the third switching element are turned on and a state where the second switching element is turned on, during the former stage of each negative half cycle of AC voltage, and
the control unit further performs control so as to repeat a state where the second switching element is turned on during the latter stage of each positive half cycle of AC voltage and to repeat a state where the fourth switching element is turned on during the latter stage of each negative half cycle of AC voltage.

4. The power conversion apparatus according to claim 2, wherein the bidirectional conversion circuit comprises
a first series circuit that includes a first switching element and a second switching element connected in series,
a second series circuit that includes a third switching element and a fourth switching element connected in series and that is connected to the first series circuit in parallel, and a diode connected in antiparallel to each switching element, wherein the control unit performs control so as to repeatedly switch between a state where the first switching element and the fourth switch element are turned on and a state where the fourth switching element is turned on, during the former stage of each positive half cycle of AC voltage, and to repeatedly switch between a state where the second switching element and the third switching element are turned on and a state where the second switching element is turned on, during the former stage of each negative half cycle of AC voltage, and the control unit further performs control so as to repeat a state where the second switching element is turned on during the latter stage of each positive half cycle of AC voltage and to repeat a state where the fourth switching element is turned on during the latter stage of each negative half cycle of AC voltage.

5. A control method for a power conversion apparatus comprising a bidirectional conversion circuit that enables first conversion converting DC to AC and second conversion converting AC to DC, AC terminals and a filter circuit that is provided between the AC terminals and the bidirectional conversion circuit and includes a capacitor, comprising:

performing control by a control unit such that the bidirectional conversion circuit makes the first conversion during a former stage of each half cycle of AC voltage, and performing control by the control unit such that the bidirectional conversion circuit makes the second conversion during a latter stage of each half cycle of AC voltage, wherein the control unit performs control such that AC target current of a polarity opposite to a polarity of the AC voltage flows from the bidirectional conversion circuit toward the AC terminals during the former stage and performs control to reduce phase shift between AC voltage and AC current flowing through the AC terminals due to a shunt current flowing the filter circuit, and the control unit performs control such that AC target current of a same polarity as a polarity of the AC voltage flows from the AC terminals toward the bidirectional conversion circuit during the latter stage and performs control to reduce phase shift between AC voltage and AC current flowing through the AC terminals due to a shunt current flowing the filter circuit.

* * * * *